United States Patent Office 2,889,345
Patented June 2, 1959

2,889,345

1α,7α-DI(ACYLTHIO) SUBSTITUTION PRODUCTS OF 4-PREGNENE-3,20-DIONES

Raymond M. Dodson, Park Ridge, and Robert C. Tweit, Wilmette, Ill., assignors to G. D. Searle & Co., Chicago, Ill., a corporation of Delaware No Drawing. Application December 31, 1957
Serial No. 706,262

6 Claims. (Cl. 260—397.45)

The present invention is concerned with 1α,7α-di(acylthio) substitution products of 4-pregnene-3,20-diones which can be represented by the general structural formula

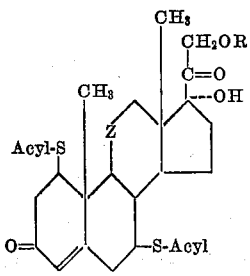

in which Acyl is a (lower)alkanoyl radical, Z can represent carbonyl or hydroxymethylene and R can represent hydrogen and (lower)alkanoyl. Among the lower alkanoyl radicals which Acyl and R can represent are formyl, acetyl, propionyl, butyryl, valeryl, hexanoyl, heptanoyl, octanoyl, and branched-chain isomers thereof, said alkanoyl radicals being the acyl radicals of alkanoic acids containing fewer than nine carbon atoms.

Compositions of the present invention can be prepared by the addition of a thioalkanoic acid of the structural formula

R′COSH wherein R′ represents hydrogen or a lower alkyl radical, to a 1,4,6-pregnatriene-3,20-dione which has the structural formula

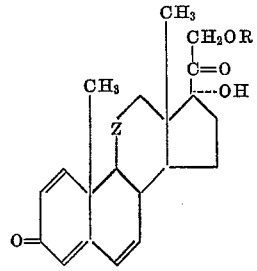

wherein R and Z have the meanings as aforesaid. The addition reaction proceeds fairly rapidly at elevated temperatures, such as those in excess of 50°, and can be carried out optionally under the influence of ultraviolet light. In carrying out the addition reaction with lower boiling thioalkanoic acids such as thioacetic acid, it is convenient to conduct the reaction at the reflux temperature of the reaction mixture; whereas with higher boiling thioalkanoic acids it is convenient to conduct the reaction at a temperature of about 90–100°. Heating periods of up to a few hours are sufficient to achieve substantial conversion to the desired reaction product. Typically, the desired compound is obtained in a satisfactory state of purity by direct filtration of the cooled reaction mixture, preceded, where necessary, by removal of excess thioalkanoic acid. If desired, however, the reaction product can be purified by chromatographic techniques using adsorbents such as silica gel followed by elution with mixtures of ethyl acetate and benzene.

The free mercaptan corresponding to the 1α,7α-di(acylthio) derivatives of the present invention can be obtained by the mild hydrolysis of the acylthio derivatives.

The addition of thioalkanoic acids to the 1,2- and 6,7-double bonds of the starting materials employed in the practice of this invention proceeds under steric influences such that of the stereoisomers formed, one is obtained in predominant amount. The isomer obtained in predominant amount has in each case been characterized herein as possessing the α-configuration of the 1- and the 7-acylthio groups. This configuration has been designated in order to provide a more complete exposition of the present invention, and in order that the specification shall constitute a more useful contribution to the art. However, the designated configuration of the 1- and 7-acylthio groups is based upon analogy, and is therefore not to be interpreted except in relation to the state of the art presently known to organic chemists. It will be apparent that no part of the specification will be materially defective if it should be established later that the configuration is the opposite of that deducible from the data presently available to workers in the field.

The compounds of the present invention have useful pharmacological properties in consequence of their hormonal action. They exhibit anti-inflammatory activity resembling that of cortisone.

This invention will appear more fully from the examples which follow. These examples are set forth by way of illustration only and it will be understood that the invention is not to be construed as limited in spirit or in scope by the details contained therein, as many modifications in materials and in methods will be apparent from this disclosure to those skilled in the art. In these examples, temperatures are given in degrees centigrade (° C.) and quantities of materials are expressed in parts by weight and parts by volume which bear the same relation one to the other as kilograms do to liters.

*Example 1*

A mixture of 5.4 parts by weight of 21-acetoxy-17α-hydroxy-1,4,6-pregnatriene-3,11,20-trione and 5.0 parts by volume of thioacetic acid is heated and irradiated with ultraviolet light for 1 hour. During the heating period a further quantity of 5 parts by volume of thioacetic acid is added. After standing overnight, the excess thioacetic acid is removed under vacuum and the residue is triturated with 100 parts by volume of ether. The solid material which forms is collected and crystallized from acetone-ether to yield 21-acetoxy-1α,7α-di(acetylthio)-17α-hydroxy-4-pregnene-3,11,20-trione; melting point 190–191°; [α]$_D$=+80.1°. The compound has the structural formula

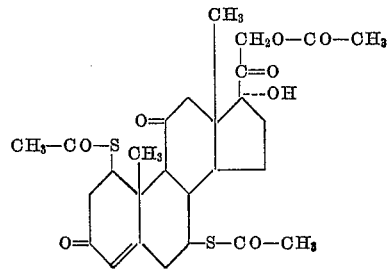

*Example 2*

A mixture of 10 parts by weight of 11β,17α,21-trihydroxy-1,4,6-pregnatriene-3,20-dione and 20 parts by weight of 3-methylbutanethiolic acid is heated on the steam bath overnight. The reaction mixture is concentrated in vacuo to dryness and the residue dissolved in benzene and chromatographed on silica gel. The chromatographic column is washed with 10,000 parts by volume each of benzene, 5% ethyl acetate in benzene and 10% ethyl acetate in benzene and eluted with 25,000 parts by volume of 15% ethyl acetate in benzene. The solvent is removed from the eluate to yield 1α,7α-di-(3-methylbutyrylthio)-11β,17α - dihydroxy-21-isovaleroxy-4-pregnene-3,20-dione as a glass having a maximum in the ultraviolet absorption spectra at 239 millimicrons. The compound exhibits infrared absorption maxima at 2.85, 5.8, 5.9 and 6.2 microns.

Example 3

A mixture of 17α,21-dihydroxy-1,4,6-pregnatriene-3,11,20-trione (1 part by weight) and 1 part by volume of thioacetic acid are heated for 20 minutes on the steam bath. Then the excess thioacetic acid is removed in vacuo and the residue is dissolved in 100 parts by volume of benzene and chromatographed on silica gel. The column is washed successively with 6000 parts by volume portions of benzene, 5% ethyl acetate in benzene, 10% ethyl acetate in benzene and 25% ethyl acetate in benzene and the product is eluted with 8000 parts by volume of 40% ethyl acetate in benzene. The solvents are removed from the eluate to yield 1α,7α-diacetylthio-17α,21-dihydroxy-4-pregnene-3,11,20-trione. The compound has a maximum in the ultraviolet absorption spectra at 235 millimicrons and infrared absorption maxima at 2.9, 5.8, 5.9, 6.0, 6.2 and 8.8 microns.

Example 4

A mixture of 8.7 parts by weight of 21-acetoxy-11β,17α-dihydroxy-1,4,6-pregnatriene-3,20-dione and 10 parts by volume of thiopropionic acid is heated on the steam bath for 4 hours. The reaction mixture is concentrated in vacuo to dryness and the residue dissolved in benzene and chromatographed on silica gel. The chromatographic column is washed with 10,000 parts by volume each of benzene, 5% ethyl acetate in benzene and 10% ethyl acetate in benzene and eluted with 25,000 parts by volume of 15% ethyl acetate in benzene. The solvent is removed from the eluate to yield 21-acetoxy-11β,17α-dihydroxy-1α,7α-di-(propionylthio)-4-pregnene-3,20-dione as a glass; $[\alpha]_D = +36.7°$; ultraviolet extinction coefficient 21,200 at 239 millimicrons.

Example 5

A mixture of 1 part by weight of 11β,17α,21-trihydroxy-1,4,6-pregnatriene-3,20-dione and 1 part by volume of thiopropionic acid is heated for 20 minutes on the steam bath. Then the excess thiopropionic acid is removed in vacuo and the residue is dissolved in 100 parts by volume of benzene and chromatographed on silica gel. The chromatographic column is washed successively with 6000 parts by volume portions of benzene, 5% ethyl acetate in benzene, 10% ethyl acetate in benzene and 25% ethyl acetate in benzene and the product is eluted with 10,000 parts by volume of 40% ethyl acetate in benzene. The solvents are removed from the eluate to yield 1α,7α-dipropionylthio-11β,17α,21-trihydroxy-4-pregnene-3,20-dione which has a maximum in the ultraviolet absorption spectra at 238 millimicrons and infrared absorption maxima at 2.9, 5.8, 5.9, 6.2 and 10.7 microns.

What is claimed is:
1. A compound of the formula

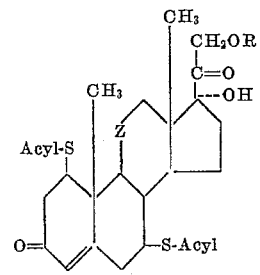

wherein Acyl is a (lower)alkanoyl radical, Z is selected from the group consisting of carbonyl and hydroxymethylene and R is selected from the group consisting of hydrogen and (lower)alkanoyl.

2. 21-acetoxy-1,7-diacetylthio-17α-hydroxy-4-pregnene-3,11,20-trione.

3. 21-acetoxy-11β,17α-dihydroxy-1,7-dipropionylthio-4-pregnene-3,20-dione.

4. 1,7-di-(3-methylbutyrylthio)-11β,17α-dihydroxy- 21-isovaleroxy-4-pregnene-3,20-dione.

5. 1,7-diacetylthio-17α,21-dihydroxy-4-pregnene - 3,11, 20-trione.

6. 1,7-dipropionylthio-11β,17α,21-trihydroxy - 4 - pregnene-3,20-dione.

No references cited.